US011306382B2

(12) United States Patent
Van Eenennaam et al.

(10) Patent No.: US 11,306,382 B2
(45) Date of Patent: Apr. 19, 2022

(54) METHOD FOR PROVIDING A ZN—AL—MG COATING, AND SUCH COATING

(71) Applicant: TATA STEEL IJMUIDEN B.V., Velsen-Noord (NL)

(72) Inventors: Jaap Peter Van Eenennaam, Heiloo (NL); Shangping Chen, Beverwijk (NL); Edgar Matthijs Toose, Hoofddorp (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 0 days.

(21) Appl. No.: 16/318,229

(22) PCT Filed: Jul. 20, 2017

(86) PCT No.: PCT/EP2017/068397
§ 371 (c)(1),
(2) Date: Jan. 16, 2019

(87) PCT Pub. No.: WO2018/015505
PCT Pub. Date: Jan. 25, 2018

(65) Prior Publication Data
US 2019/0233928 A1    Aug. 1, 2019

(30) Foreign Application Priority Data
Jul. 20, 2016  (EP) .................................... 16180373

(51) Int. Cl.
*C23C 2/20* (2006.01)
*C23C 2/06* (2006.01)
(Continued)

(52) U.S. Cl.
CPC .............. *C23C 2/20* (2013.01); *B32B 15/013* (2013.01); *C22C 18/04* (2013.01); *C23C 2/06* (2013.01); *C23C 2/16* (2013.01); *C23C 2/40* (2013.01)

(58) Field of Classification Search
CPC ..... C23C 2/06; C23C 2/16; C23C 2/20; C23C 2/40; B23B 15/013
(Continued)

(56) References Cited

U.S. PATENT DOCUMENTS

| 2012/0052206 A1 | 3/2012 | Diez et al. |
| 2013/0183541 A1 | 7/2013 | Kim et al. |

(Continued)

FOREIGN PATENT DOCUMENTS

| EP | 1466994 A1 * | 10/2004 | ............... C23C 2/26 |
| JP | 2001295018 A | 10/2001 | |
| WO | 2015055285 A1 | 4/2015 | |

OTHER PUBLICATIONS

GalvInfoNote, "Understanding Coating Weight Designations for Zinc-Based Coatings on Steel Sheet." Jan. 2004, URL: <http://www.steelmillsoftheworld.com/activities/datacenter/G_Note1.pdf>, pp. 1-7 (Year: 2004).*

International Search Report and Written Opinion dated Sep. 27, 2017 for PCT/EP2017/068397 to Tata Steel Ijmuiden B.V. filed Jul. 20, 2017.

(Continued)

*Primary Examiner* — Humera N. Sheikh
*Assistant Examiner* — Katherine A Christy
(74) *Attorney, Agent, or Firm* — Vorys, Sater, Seymour and Pease LLP

(57) ABSTRACT

A Zn—Al—Mg coating on a steel strip. Specific amounts of Mg and Al are chosen, in a relationship wherein the amount of Al is higher than the amount of Mg. Also provided is a method for providing a steel strip having a Zn—Al—Mg (Continued)

h=200mm, 35.2g/m2 h=300mm, 34.6g/m2 coating provided by hot dip coating with a coating bath, wherein the thickness of the coating is controlled using gas knifes above the coating bath.

25 Claims, 1 Drawing Sheet

(51) Int. Cl.
    *C23C 2/40*     (2006.01)
    *C23C 2/16*     (2006.01)
    *B32B 15/01*     (2006.01)
    *C22C 18/04*     (2006.01)

(58) Field of Classification Search
    USPC .......................................................... 428/659
    See application file for complete search history.

(56) References Cited

U.S. PATENT DOCUMENTS

| | | | |
|---|---|---|---|
| 2014/0302343 A1* | 10/2014 | Maalman | B32B 15/04 |
| | | | 428/659 |
| 2015/0107722 A1 | 4/2015 | Nakano et al. | |
| 2015/0225831 A1* | 8/2015 | Riener | C23C 2/40 |
| | | | 428/659 |
| 2016/0002763 A1 | 1/2016 | Diez et al. | |
| 2018/0209011 A1* | 7/2018 | Denks | C22C 18/00 |
| 2019/0127819 A1* | 5/2019 | Minami | C21D 8/0205 |

OTHER PUBLICATIONS

What is a Uniform Distribution, ThoughtCo., URL:<https://www.thoughtco.com/uniform-distribution-3126573>, retrieved from the Internet Jul. 22, 2020.

* cited by examiner h=200mm, 35.2g/m2
h=300mm, 34.6g/m2
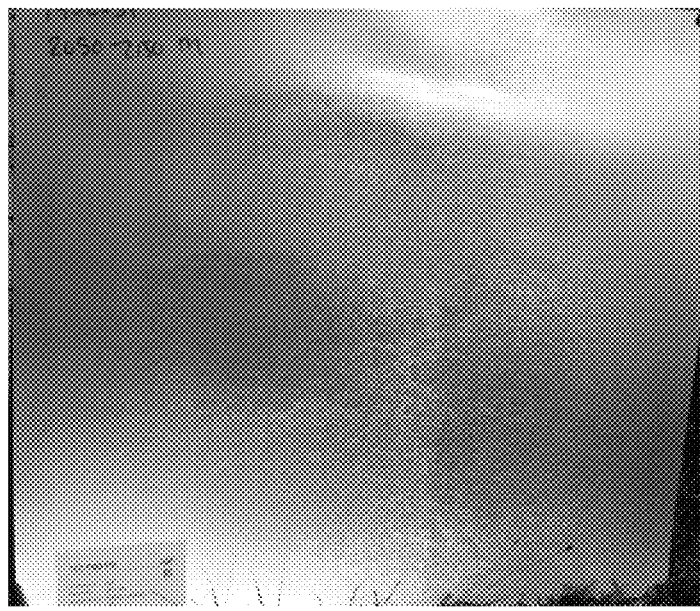

METHOD FOR PROVIDING A ZN—AL—MG COATING, AND SUCH COATING

CROSS-REFERENCE TO RELATED APPLICATIONS

This is a § 371 National Stage Application of International Application No. PCT/EP2017/068397 filed on Jul. 20, 2017, claiming the priority of European Patent Application No. 16180373.9 filed on Jul. 20, 2016.

The invention relates to a method for providing a Zn—Al—Mg coating on a steel strip using a hot dip coating process with a coating bath, wherein the thickness of the coating is controlled using gas knifes above the coating bath. The invention also relates to a steel strip having a Zn—Al—Mg coating provided by hot dip coating.

Zinc alloy coatings containing both aluminium and magnesium are well known and are more and more used, the last years also in the automotive industry. Most zinc alloy coatings containing both Al and Mg use approximately the same amount of Al and Mg.

However, for automotive purposes the requirements of zinc coatings are high, especially the appearance of outer parts. It has been found that Zn—Al—Mg coatings sometimes show a defect in the form of a stripe pattern of matte and bright lines running at intervals in the width direction of the sheet, perpendicular to the length direction of the strip. The distance between these lines is about 15 to 20 mm. This defect is sometimes called a beach defect.

It is an object of the invention to provide a method to produce a steel strip having a Zn—Al—Mg coating having a good appearance without such patterns.

It is another object of the invention to provide steel strip having a Zn—Al—Mg coating having a good appearance without such patterns.

According to a first aspect of the invention is provided a method for providing a Zn—Al—Mg coating on a steel strip using a hot dip coating process with a coating bath, wherein the thickness of the coating is controlled using gas knifes above the coating bath, wherein the coating on the steel strip is given a composition consisting of:
  1.0-1.5 weight % magnesium;
  1.5-2.4 weight % aluminium;
  optional<0.3 weight % of Si, Sn, Bi, Sb, Ln, Ce, Ti, Sc, Sr and/or B in total;
  the remainder being zinc and unavoidable impurities;
  wherein the Al and Mg contents satisfy the relationship:
  Al (in weight %)>1.28 Mg (in weight %)+0.25, and wherein $Z<0.6\ e^{0.064CW}$ Z being the distance between each gas knife and the steel strip in mm, and CW being the weight of the one-sided coating layer in g/m$^2$,
when CW<45 g/m$^2$.

The inventors have found that beach defects are only present in Zn—Al—Mg coatings, and not in Zn-based coatings not containing Mg, and neither in hot dip aluminium coatings. The inventors have found further that in zinc alloys containing aluminium and magnesium, not only primary crystals but also a matrix of secondary and ternary eutectic microstructures are present. Experiments have shown that for certain compositions of the Zn—Al—Mg coating, the beach defects can be reduced or can disappear. It has been found by the inventors, that is the case when the amounts of Al and Mg satisfy the relationship Al (in weight %)>1.28 Mg (in weight %)+0.25.

On the other hand, the corrosion resistance of the coated steel strip should be good, and therefore the amount of Mg should not be less than 1.0 weight %. Furthermore, there is no need to add more than 1.5 weight % Mg. The amount of Al should thus be higher than 1.5 weight %, but too much Al results in filiform corrosion, hence the maximum amount of Al should be 2.4 weight %.

Apart from the composition of the coating, the inventors have found that surface effects such as beach defects are caused by non-uniform coatings on the steel. Non-uniform coatings result from the use of the gas knifes which reduce the thickness of the coating. The inventors have found that a relation exists between the distance between the gas knifes and the steel strip, and the coating weight resulting from the use of the gas knifes. This relation is given by the formula $Z<0.6\ e^{0.064CW}$ which holds when the coating weight on each side of the metal strip is less than 45 g/m$^2$. When distance Z and coating weight fulfil this formula, the surface defects are reduced or disappear. Preferably the coating weight on each side of the metal strip is less than 40 g/m$^2$, more preferably less than 35 g/m$^2$, to be sure no surface defects are present at all.

Preferably, the optional total weight of Si, Sn, Bi, Sb, Ln, Ce, Ti, Sc, Sr and/or B is <0.1 weight %. Usually, there is no need to add (much) of these optional elements.

According to a preferred embodiment the coating has a composition in which magnesium is present between 1.1 and 1.5 weight %, more preferably between 1.2 and 1.5 weight %, and even more preferably between 1.3 and 1.5 weight %, and/or the coating has a composition in which aluminium is present between 1.6 and 2.4 weight %, more preferably between 1.7 and 2.4 weight %, even more preferably between 1.8 and 2.4 weight %, most preferably between 1.9 and 2.3 weight %. With these limited ranges of magnesium and/or aluminium, the surface defects will be reduced.

According to a preferred embodiment, the gas knifes have a distance above the bath of at most 500 mm. The inventors have found that the distance of the gas knifes above the coating bath has an influence on the surface appearance of the coated steel strip. Though there is no proof, the inventors adhere to the theory that by keeping a short distance between the coating bath and the gas knifes, the pressure inhomogeneities of the gas pressure by the gas knifes is reduced. Such pressure inhomogeneities can result from vortices that move to the right en left of the steel strip passing the gas knifes. The coating has shown to have a better appearance when the distance of the gas knifes above the bath is at most 500 mm.

Preferably, the gas knifes have a distance above the bath of at most 400 mm, more preferably at most 300 mm. The smaller the distance between gas knifes and bath, the more homogeneous the pressure. However, when the distance is small, there is a risk that splashes from the removed zinc alloy contaminate the gas knifes.

According to a preferred embodiment the strip has a roughness Ra<1.5 µm before entering the coating bath. When the roughness of a steel strip is high, the surface appearance of the strip after coating is unsatisfactory. Therefore, the roughness Ra of the surface should be lower than 1.5 µm. Preferably, the roughness of the strip Ra is smaller than 1.0 µm before entering the coating bath. Thus, an even better surface appearance of the strip can be obtained.

Preferably, the steel strip is a carbon steel strip. Usually carbon steel strip is coated to improve the corrosion resistance of the steel. The carbon steel can in fact have any practical composition.

According to a preferred embodiment, the coated steel strip has a width between 400 and 2500 mm and a gauge between 0.5 and 5 mm. These are the normal steel strip dimensions.

Preferably the coated steel strip has a length between 400 and 40.000 m, more preferably between 1000 and 4000 m. These are the normal lengths of coated steel strips as sold.

According to a second aspect of the invention there is provided a steel strip having a Zn—Al—Mg coating provided by hot dip coating, characterised in that the coating has a composition consisting of:
- 1.0-1.5 weight % magnesium;
- 1.5-2.4 weight % aluminium;
- optional<0.3 weight % of Si, Sn, Bi, Sb, Ln, Ce, Ti, Sc, Sr and/or B in total;
- the remainder being zinc and unavoidable impurities;

wherein the Al and Mg contents satisfy the relationship:
Al (in weight %)>1.28 Mg (in weight %)+0.25,
wherein the coating weight of a one-sided coating layer is less than 45 g/m$^2$,
and wherein the coating does not contain binary (Zn+MgZn$_2$) microstructures.

The coating according to the second aspect of the invention can be provided using the method according to the first aspect of the invention, but it is also possible that this coating is provided using another method. However, the composition of the coating according to the second aspect of the invention is essential, for the same reasons as elucidated with respect to the first aspect of the invention. Moreover, it is essential that the coating does not contain binary (Zn+MgZn$_2$) microstructures. The inventors have found that binary (Zn+MgZn$_2$) microstructures disturb the forming of a homogeneous coating during the cooling and solidification of the coating. This can result in the forming of line patterns in the coating, known as beach defect.

Preferably the coating weight on each side of the metal strip is less than 40 g/m$^2$, more preferably less than 35 g/m$^2$, to be sure no surface defects are present at all. According to a preferred embodiment the coating has a composition in which magnesium is present between 1.1 and 1.5 weight %, preferably between 1.2 and 1.5 weight %, more preferably between 1.3 and 1.5 weight %. Tighter ranges provide a better microstructure of the coating.

According to another preferred embodiment the coating has a composition in which aluminium is present between 1.6 and 2.4 weight %, preferably between 1.7 and 2.4 weight %, more preferably between 1.8 and 2.4 weight %, most preferably between 1.9 and 2.3 weight %.

Preferably the coating has a uniformly distributed (Al+Zn+MgZn$_2$) ternary eutectic structure. Due to the uniform distributed ternary eutectic layer, a smooth coating surface can be formed.

The invention will be elucidated referring to the following examples.

FIG. 1 shows a comparison between the surfaces of coated sheets, wherein the gas knives had a different height above the coating bath.

Table 1 shows the result of the use of different parameters in the method for coating a strip of carbon steel. The type of carbon steel is not important for the coating that is formed.

For all examples, the coating consists of 1.4 weight % magnesium, 2.0 weight % aluminium, the remainder being zinc and unavoidable impurities. No amount of Si, Sn, Bi, Sb, Ln, Ce, Ti, Sc, Sr or B has been added.

Strip 1 and strip 2 have been used as test strips, for which during the coating process the coating weight CW, the gas knife distance to the strip Z and the height of the gas knifes above the coating bath H have been changed.

Strip 3, strip 4 and strip 5 are industrially produced and therefore in producing each strip, the strip has got the same coating weight and the same gas knife distance has been used, as well as the same height above the coating bath.

The velocity V of the strip during coating is given in table 1, but the velocity has no influence on the existence of beach defects.

TABLE 1 beach defect or no beach defect as a result of coating weight (single sided), distance of gas knife and height of gas knifes above coating bath.

| Sample | CW [g/m$^2$ ss] | Z [mm] | H [mm] | V | Beach |
|---|---|---|---|---|---|
| Strip 1 | | | | | |
| 1 | 42.5 | 7 | 300 | 101.9 | N |
| 2 | 39 | 7 | 200 | 101.9 | N |
| 3 | 42.7 | 7 | 400 | 101.9 | N |
| 4 | 37.8 | 5 | 400 | 101.9 | N |
| 5 | 39.6 | 5 | 350 | 101.9 | N |
| 6 | 39.6 | 5 | 300 | 101.9 | N |
| 7 | 39.6 | 5 | 200 | 101.9 | N |
| 8 | 29.3 | 5 | 400 | 101.9 | Y |
| 9 | 29.1 | 5 | 400 | 101.9 | Y |
| 10 | 29.2 | 5 | 300 | 101.9 | Y |
| 11 | 34.2 | 5 | 300 | 101.9 | Y |
| Strip 2 | | | | | |
| 1 | 40.4 | 10 | 200 | 100.8 | Y |
| 2 | 40.6 | 10 | 200 | 100.8 | Y |
| 3 | 40.9 | 9 | 200 | 100.8 | light |
| 4 | 41.6 | 8 | 200 | 100.8 | N |
| 5 | 43.3 | 6 | 200 | 100.8 | N |
| 6 | 43.4 | 6 | 200 | 85 | N |
| 7 | 43.6 | 7 | 200 | 85 | N |
| 8 | 43.1 | 8 | 200 | 85 | N |
| 9 | 40.4 | 10 | 200 | 85 | Y |
| 10 | 36.9 | 10 | 200 | 85 | Y |
| Strip 3 | 38 | 9 | 350 | 105 | Y |
| Strip 4 | 38 | 8 | 350 | 105 | light |
| Strip 5 | 38 | 7.5 | 350 | 105 | N |

In the right-hand column an N means that no beach defects were seen, a Y means that beach defects are present, and 'light' means that only a few beach defects could be found.

Strip 3, 4 and 5 show very clearly that the distance between the strip and the gas knife Z had a major effect on the appearance of beach defects. When this distance is diminished while the coating weight CW remains the same, it turns out that the beach defects diminish or disappear fully.

The experiments with strip 1 and strip 2 show corresponding results. Strip 1 shows that when the coating weight is smaller, beach defects will still be present when the distance Z between gas knives and strip is not reduced in accordance with the formula Z <0.6 e$^{0.064 CW}$ Strip 2 clearly shows that when the distance Z between the gas knives and the strip is large, even when the coating weight is almost 45 g/m$^2$, beach defects will appear.

The inventors have found that when using a zinc alloy containing 1.4 weight % Mg and 2.0 weight % Al, no binary (Zn+MgZn$_2$) microstructures are present in the coating and that a homogeneous coating is present.

FIG. 1 shows the surface of coated sheets, where for manufacturing the left-hand sheet the gas knives were placed at a height of 200 mm above the coating bath, and where for manufacturing the right-hand sheet the gas knives were places at a height of 300 mm above the coating bath. In both cases, the coating weight was approximately 35 g/m2. The distance between each gas knife and the strip was 6 mm.

FIG. 1 clearly shows that the upper sheet has a better surface appearance than the lower sheet. Since all other manufacturing parameters are the same, FIG. 1 thus shows that the height of the gas knifes above the coating bath is a determining factor for the surface appearance of the sheets produced, and notably that a gas knifes height of 200 mm above the bath surface provides a better surface than a height of 300 mm.

The invention claimed is:

1. A steel strip having a Zn—Al—Mg coating provided by hot dip coating, wherein the coating has a composition consisting of:
   1.1-1.4 weight % magnesium;
   1.9-2.3 weight % aluminium;
   optional <0.3 weight % of Sn, Bi, Sb, Ln, Ce, Ti, Sc, Sr and/or B in total;
   the remainder consisting of zinc and unavoidable impurities;
   wherein the Al and Mg contents satisfy the relationship:
   Al (in weight %) >1.28 Mg (in weight %)+0.25 with the proviso that if Al is 2.0 weight % then Mg may be 1.4 weight %,
   wherein the coating weight of a one-sided coating layer is 35 to less than 45 g/m², and
   wherein the coating does not contain binary (Zn+MgZn$_2$) microstructures,
   wherein the coating has an absence of a visible beach defect;
   wherein the strip has a roughness Ra<1.5 μm before entering a coating bath for the hot dip coating,
   wherein the coated steel strip is made by a process comprising controlling the thickness of the coating using gas knifes above a coating bath that provides the alloy for the coating and wherein Z is a value in a range of 5 to 8 mm that meets an equation $Z<0.6\ e^{0.064CW}$, wherein Z is the distance between each gas knife and the steel strip in mm, and wherein CW is the weight of the one-sided coating layer in g/m² and wherein each said gas knife has a distance above the coating bath of at most 500 mm.

2. The steel strip according to claim 1, wherein the coating weight on each side of the metal strip is 40 to less than 45 g/m² and no surface defects are present at all.

3. The steel strip according to claim 2, wherein Z is in a range from 5 to 8 mm and wherein each said gas knife has a distance above the coating bath of at most 400 mm.

4. The steel strip according to claim 2 wherein the coated steel strip has a length between 1000 and 4000 m and the coating is homogeneous.

5. The steel strip according to claim 1, wherein the coating weight on each side of the metal strip 35 to less than 40 g/m², and no surface defects are present at all, wherein Z is the distance between each gas knife and the steel strip in mm, and wherein Z is in a range from 5 to 7.5 mm, wherein the gas knifes have a distance above the bath of at most 400 mm.

6. The steel strip according to claim 1, wherein Z is in a range from 5 to 7 mm.

7. The steel strip according to claim 2, wherein the coating has a composition in which 2.0-2.3 weight % aluminium is present.

8. The steel strip according to claim 5, wherein the coating has a composition in which 2.0-2.3 weight % aluminium is present.

9. The steel strip according to claim 1, wherein the coating has a uniformly distributed (Al+Zn+MgZn2) ternary eutectic structure.

10. The steel strip according to claim 1, wherein the coating has no Ti, wherein the coating weight of the one-sided coating layer is 37.8 to less than 45 g/m² and 2.0-2.3 weight % aluminium is present.

11. The steel strip according to claim 1, wherein the coating has a composition in which 1.1-1.3 weight % magnesium is present.

12. The steel strip according to claim 1, wherein in the coating composition 1.2-1.4 weight % magnesium is present.

13. The steel strip according to claim 1, wherein the steel strip is a carbon steel strip,
   wherein in the coating composition 1.2-1.4 weight % magnesium is present and 2.0-2.3 weight % aluminium is present,
   wherein the coating weight of the one-sided coating layer is 37.8 to less than 45 g/m².

14. The steel strip according to claim 1, wherein the coating weight of the one-sided coating layer is 37.8 to 43.6 g/m².

15. The steel strip according to claim 14, wherein in the coating composition 1.1-1.2 weight % magnesium is present.

16. The steel strip according to claim 1, wherein the optional total weight of Sn, Bi, Sb, Ln, Ce, Ti, Sc, Sr and/or B is <0.1 weight %.

17. The steel strip according to claim 1, wherein the coating weight on each side of the metal strip is <37.8 to 43.6 g/m².

18. The steel strip according to claim 1, wherein Z is in a range from 5 to 8 mm and wherein each said gas knife has a distance above the coating bath of at most 400 mm.

19. A method for providing a Zn—Al—Mg coating on a steel strip of claim 1 using a hot dip coating process with a coating bath, wherein the thickness of the coating is controlled using gas knifes above the coating bath, wherein to obtain a good appearance without a beach defect the coating on the steel strip is given a composition consisting of:
   1.2-1.5 weight % magnesium;
   between 1.8 and 2.4 weight % aluminium;
   optional <0.3 weight % of Sn, Bi, Sb, Ln, Ce, Ti, Sc, Sr and/or B in total;
   the remainder consisting of zinc and unavoidable impurities;
   wherein the Al and Mg contents satisfy the relationship:
   Al (in weight %) >1.28 Mg (in weight %)+0.25 with the proviso that if Al is 2.0 weight % then Mg may be 1.4 weight %,
   and wherein $Z<0.6\ e^{0.064CW}$
   wherein Z is the distance between each gas knife and the steel strip in mm, and wherein CW is the weight of the one-sided coating layer in g/m²,
   wherein CW 35 to <45 g/m², wherein the gas knifes have a distance above the bath of at most 500 mm.

20. The method according to claim 19, wherein CW<40 g/m².

21. The method according to claim 1, wherein the gas knifes have a distance above the bath of at most 250 mm.

22. The method according to claim 1, wherein the strip has a roughness Ra<1.0 μm before entering the coating bath.

23. The method according to claim 19, wherein the steel strip is a carbon steel strip.

24. The method according to claim 19, wherein the coated steel strip has a width between 400 and 2500 mm and a gauge between 0.5 and 5 mm.

25. The method according to claim 19, wherein the coated steel strip has a length between 400 and 40,000 m.

\* \* \* \* \*